United States Patent Office 2,973,376
Patented Feb. 28, 1961

2,973,376
11-OXYGENATED-2-METHYL-21-FLUORO PROGESTERONE DERIVATIVES

Josef Fried and Josef E. Herz, New Brunswick, N.J., assignors to Olin Mathieson Chemical Corporation, New York, N.Y., a corporation of Virginia No Drawing. Filed May 10, 1956, Ser. No. 583,934

3 Claims. (Cl. 260—397.45)

This invention relates to the synthesis of valuable steroids and has for its objects the provision of (I) an advantageous process for preparing 2-methyl steroids of the pregnane (including the pregnene) series, fluoro substituted in the 21-position having an 11β-hydroxy (or 11-keto) substituent; (II) certain 21-alkanesulfonyloxy compounds useful as intermediates in the preparation of these steroids; and (III) certain physiologically active steroids which are new and useful in themselves.

The process of this invention essentially comprises: (a) converting a 2-methyl-21-hydroxy steroid of the pregnane series having an 11β-hydroxy (or 11-keto) substituent, into the corresponding 21-alkanesulfonyloxy-derivative thereof; and (b) converting the latter directly to the corresponding 21-fluoro derivative. If the starting material contains an 11β-hydroxy substituent, it can, if desired, be oxidized in the usual manner to the corresponding 11-keto derivative, as by treatment with chromic acid in an acid medium.

The novel compounds of this invention comprise 21-fluoro-2-methyl 11β-hydroxy (or 11-keto)-steroids of the pregnane series.

The preferred compounds preparable by the process of this invention are those which are comprehended by the general formula:

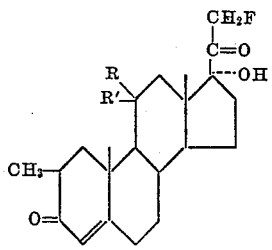

wherein R is hydrogen, R' is β-hydroxy, or together R and R' is oxygen.

Representative steroids preparable by the process of this invention include 21-fluoro-2-methyl-11,17α-dihydroxyprogesterone; and 21-fluoro-2-methyl-11-keto-17α-hydroxy-progesterone.

To prepare these 21-fluoro and compounds, a steroid of the general formula

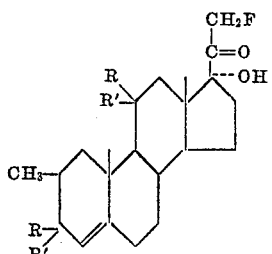

wherein R and R' are as above defined, is reacted with an alkanesulfonyl halide. Representative steroids suitable as initial reactants in the process of this invention include 2-methylhydrocortisone and 2-methyl-cortisone.

These steroids are reacted with an alkanesulfonyl halide (sulfonyl chlorides are preferred, but other halides such as bromides and iodides may be used). Although any alkanesulfonyl chloride may be used, the alkane group is preferably a lower alkane, methanesulfonyl chloride (mesyl chloride) being particularly preferred. The reaction is carried out by intermixing the steroid and sulfonyl halide under substantially anhydrous conditions and preferably in the cold (e.g., at a temperature less than about 20° C.) in the presence of pyridine or other organic base.

The reaction results in the production of new intermediate steroids containing in the 21-position an alkanesulfonyloxy radical which corresponds to the alkanesulfonyl halide used in the reaction. The preferred intermediate 21-alkanesulfonyloxy compounds of this invention are those of the following general formula

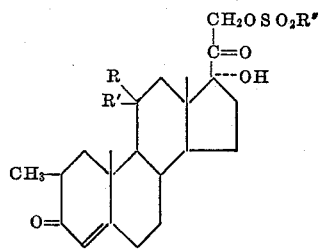

wherein R'' is alkyl (preferably lower alkyl) and R and R' are as hereinbefore defined.

The 21-alkanesulfonyloxy intermediates of this invention are then reacted with an alkali metal fluoride (particularly potassium fluoride) in an organic solvent of high dielectric constant, such as dimethylformamide or dimethylsulfoxide. This reaction is preferably, but not necessarily, conducted at elevated temperature, a temperature range of 100–130° C. being preferred.

The reaction yields the 21-fluoro final products of this invention. The preferred 21-fluoro compounds of this invention are those of the general formula

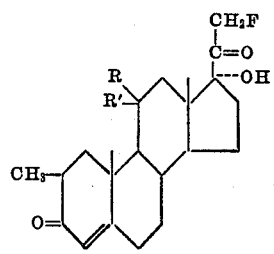

wherein R and R' are as hereinbefore defined.

If the starting steroid contains an 11β-hydroxy group, and an 11-keto steroid is desired as the final product, the former can be oxidized in the usual manner, as by treating with a hexavalent chromium compound (e.g., chromic acid) in an acid medium (e.g., glacial acetic acid).

The 2-methyl steroids of the pregnane (including the pregnene) series of this invention, which are fluoro-substituted in the 21-position and have an 11β-hydroxy or 11-keto substituent, are physiologically active compounds, which possess glucocorticoid activity. Thus, the new steroids of this invention can be administered instead of, and in the same manner as, cortisone or hydrocortisone in the treatment of rheumatoid arthritis and dermatomyositis. The dosage for such administration is, of course, dependent on the relative activity of the compound.

The following examples are illustrative of the invention (all temperatures being in centigrade):

EXAMPLE 1

*2-methylhydrocortisone 21-mesylate*

To a solution of 50 mg. of 2-methylhydrocortisone in 1 ml. of pyridine is added at 0°, 0.10 ml. of methanesulfonyl chloride. After 2.5 hours at 0°, water is added and the resulting mixture is extracted with dilute hydrochloric acid, dilute sodium bicarbonate and water. The chloroform extract is dried over sodium sulfate and evaporated to dryness in vacuo. The residual syrup represents essentially pure 2-methylhydrocortisone 21-mesylate and is used in the process of Example 2 without further purification.

EXAMPLE 2

*21-fluoro-2-methyl-11β,17α-dihydroxyprogesterone*

A mixture containing 100 mg. of 2-methylhydrocortisone mesylate and 100 mg. of anhydrous potassium fluoride in 4 ml. of freshly distilled dimethylformamide is heated under nitrogen at 110° for 17 hours. After removal of the bulk of the solvent in vacuo, the mixture is taken up in water and chloroform, the chloroform solution washed with water, dried over sodium sulfate and the solvent removed in vacuo. The residual solid is then recrystallized from 95% alcohol.

EXAMPLE 3

*21-fluoro-2-methyl-17α-dihydroxy-11-ketoprogesterone*

To a solution of 25 mg. of 21-fluoro-2-methyl-11β,17α-dihydroxyprogesterone in 2 ml. of glacial acetic acid is added over a period of 15 minutes a solution of 12 mg. of chromic acid in 2 ml. of acetic acid. After an additional 10 minutes at room temperature, 0.2 ml. of alcohol is added to destroy excess chromium trioxide and the solution is concentrated in vacuo to small volume. The residual syrup is distributed between chloroform and water and the chloroform solution washed with water, dilute sodium bicarbonate solution and again with water. After drying over sodium sulfate, the solvent is removed in vacuo and the crystalline residue consisting of 21-fluoro-2-methyl-11-keto-17α-hydroxyprogesterone is recrystallized from 95% ethanol.

The invention may be otherwise embodied within the scope of the appended claims.

We claim:

1. 21-fluoro-2-methyl-11β,17α-dihydroxyprogesterone.
2. A steroid of the general formula

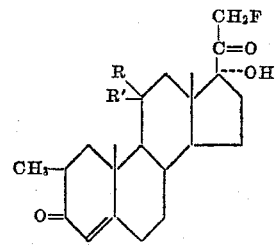

wherein R is hydrogen, R' is β-hydroxy and together R and R' is oxygen.

3. 21-fluoro-2-methyl-11-keto-17α-hydroxyprogesterone.

References Cited in the file of this patent

UNITED STATES PATENTS

| | | |
|---|---|---|
| 2,684,968 | Bergstrom | July 27, 1954 |
| 2,713,587 | Bergstrom | July 19, 1955 |
| 2,734,065 | Hogg | Feb. 7, 1956 |
| 2,763,671 | Fried | Sept. 18, 1956 |
| 2,768,191 | Warnant | Oct. 23, 1956 |
| 2,862,936 | Lincoln et al. | Dec. 2, 1958 |
| 2,865,935 | Schneider et al. | Dec. 23, 1958 |